(12) United States Patent
Jang et al.

(10) Patent No.: US 8,718,709 B2
(45) Date of Patent: May 6, 2014

(54) METHOD AND APPARATUS FOR USING PORTABLE TERMINAL

(75) Inventors: Jin-Yeoul Jang, Gyeongsangbuk-do (KR); Jong-Soo Kim, Daegu (KR)

(73) Assignee: Samsung Electronics Co., Ltd., Yeongton-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 13/313,127

(22) Filed: Dec. 7, 2011

(65) Prior Publication Data

US 2012/0149435 A1 Jun. 14, 2012

(30) Foreign Application Priority Data

Dec. 9, 2010 (KR) ........................ 10-2010-0125872

(51) Int. Cl.
*H04M 1/00* (2006.01)

(52) U.S. Cl.
USPC ..... 455/558; 455/557; 455/432.2; 455/432.3; 455/410; 455/411

(58) Field of Classification Search
USPC ........... 455/455, 558, 557, 432.3, 432.2, 410, 455/411
See application file for complete search history.

(56) References Cited

U.S. PATENT DOCUMENTS

| | | | |
|---|---|---|---|
| 2005/0107114 A1* | 5/2005 | Ocock | 455/550.1 |
| 2006/0079281 A1* | 4/2006 | Ravindra et al. | 455/558 |
| 2008/0081609 A1* | 4/2008 | Burgan et al. | 455/425 |
| 2010/0037047 A1* | 2/2010 | Varriale et al. | 713/165 |
| 2010/0041438 A1* | 2/2010 | Brown | 455/558 |
| 2010/0081423 A1* | 4/2010 | Knight | 455/422.1 |
| 2010/0169910 A1* | 7/2010 | Collins et al. | 725/14 |
| 2011/0294472 A1* | 12/2011 | Bramwell et al. | 455/413 |
| 2012/0108294 A1* | 5/2012 | Kaul | 455/558 |

\* cited by examiner

*Primary Examiner* — Khalid Shaheed
(74) *Attorney, Agent, or Firm* — Cha & Reiter, LLC (57) ABSTRACT

A method for using a portable terminal includes: determining whether an inserted SIM card contains one or more generated user accounts, and displaying a list of the existing user accounts; when any one of the user accounts is selected, identifying a setting value corresponding to the selected user account; and setting a usage environment of the portable terminal according to the identified setting value.

18 Claims, 5 Drawing Sheets

METHOD AND APPARATUS FOR USING PORTABLE TERMINAL

CLAIM OF PRIORITY

This application claims priority under 35 U.S.C. §119(a) to a Korean Patent Application entitled "Method and Apparatus for Using Portable Terminal" filed in the Korean Intellectual Property Office on Dec. 9, 2010 and assigned Serial No. 10-2010-0125872, the contents of which are incorporated herein by reference.

BACKGROUND OF THE INVENTION

1. Field of the Invention

The present invention relates to a portable terminal, and in particular, to a method and an apparatus for using a portable terminal by setting a usage environment of the portable terminal through a SIM card inserted therein.

2. Description of the Related Art

Portable terminals are changing into the multi-purpose devices capable of providing various functions.

Recently, the application of a SIM (Subscriber Identification Module) card in portable terminals is becoming a more common usage. A user is allowed to use the portable terminal after subscriber information and authentication information related to security in the inserted SIM card are identified. After storing phone book data such as telephone numbers in the SIM card, the user may insert the SIM card into another portable terminal for use.

In the known art, when the portable terminal is used with one SIM card, the usage environment of the portable terminal corresponding to only one user is applied. In other words, it is impossible for plural users to use the portable terminal only one SIM card.

Therefore, there is a need, by which a single or plural users can set a usage environment of a portable terminal suitable for each user according to the user accounts and use the portable terminal even when the portable terminal is equipped with only one SIM card.

SUMMARY OF THE INVENTION

Accordingly, the present invention has been made to solve the above-mentioned problems occurring in the prior art, and the invention provides a method and an apparatus for using a portable terminal by setting its usage environment suitable for a number of users when they use the portable terminal using one SIM card.

In accordance with an aspect of the present invention, a method for using a portable terminal, the method includes: when a SIM (Subscriber Identification Module) has been inserted, determining whether one or more generated user accounts exist in the inserted SIM card, and displaying a list of the existing user accounts; when a user account has been selected from the displayed user accounts, identifying a setting value corresponding to the selected user account; and setting a usage environment of the portable terminal according to the identified setting value.

In accordance with another aspect of the present invention, an apparatus for using a portable terminal includes: a controller for making a control to determine whether one or more generated user accounts exist in an inserted SIM card, to display a list of the existing user accounts, to identify a setting value corresponding to the selected user account when a user account has been selected from the displayed user accounts, and to set a usage environment of the portable terminal according to the identified setting value.

According to the present invention, when the portable terminal is used with the SIM card inserted therein, the usability of the portable terminal is effectively increased by dividing its usage environment depending on plural user accounts.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE INVENTION

Hereinafter, embodiments of the present invention are described in detail with reference to the accompanying drawings.

Figure 1:
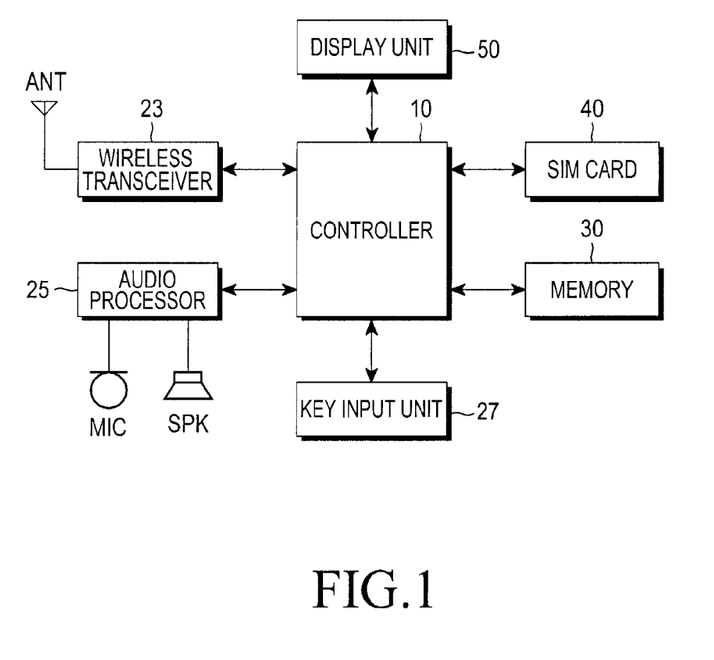
FIG. 1 is a block diagram illustrating a portable terminal according to an embodiment of the invention.

FIG. 1 is a block diagram illustrating a portable terminal according to an embodiment of the invention. The portable terminal according to the embodiment of the invention is a movable electronic apparatus, which may be a display phone, a smart phone, an IMT-2000 (International Mobile Telecommunication 2000) terminal, a WCDMA terminal, a UMTS (Universal Mobile Telecommunication Service) terminal, a PDA (Personal Digital Assistant), a PMP (Portable Multimedia Player), a DMB (Digital Multimedia Broadcasting), a personal computer, a desktop computer, a notebook and the like.

Although devices, such as a GPS module, a camera module, a Bluetooth module, a Wi-Fi module, an acceleration sensor, a proximity sensor, and a DMB (Digital Multimedia Broadcasting) receiver, are not shown in the block diagram of FIG. 1, it should be apparent to those skilled in the art that these devices may be included and can provide corresponding functions in the portable terminal according to the embodiment of the invention.

For example, the acceleration sensor may be used to measure dynamic force, such as acceleration, vibration, and impact, and sense the movement state of the portable terminal, so as to detect a display direction of a display unit of the portable terminal. Further, the proximity sensor may be used to sense a part of user's body approaching the portable terminal for the purpose of preventing an operational fault of the portable terminal in the touch screen function. Further, the gyroscope may be used to observe a mechanical movement of the rotating portable terminal to sense the six types of motions of the portable terminal (including the up-down movement, left-right movement, forward-backward movement, and rotations around x, y, and z axes) in conjunction with the acceleration sensor.

Referring to FIG. 1, the wireless transceiver 23 includes an RF unit and a MODEM. The RF unit includes an RF transmitter which up-converts and amplifies frequencies of a transmission signal and an RF receiver which amplifies a reception signal at a low noise level and down-converts the frequencies thereof. The MODEM includes a transmitter which encodes and modulates a signal to be sent and a receiver which demodulates and decodes a signal to be received from the RF unit. On the other hand, if the portable terminal according to the embodiment of the invention supports plural communication networks such as CDMA and GSM, the wireless transceiver 23 according to the embedment of the invention may include plural antennas (ANT) for supporting the CDMA and the GSM respectively.

An audio processor 25 may include a codec which includes a data codec and an audio codec. The data codec processes a data packet, and the audio codec processes an audio signal such as a voice and a multimedia file. The audio processor 25 serves to convert a digital audio signal from the MODEM into an analog signal using the audio codec and then reproduce it, or convert an analog signal generated from a microphone into a digital audio signal using the audio codec and then transmit it to the MODEM. The codec may be provided separately or may be included in a controller 10.

In operation, when any one of the user accounts is selected and setting values corresponding to the selected user account are applied to the portable terminal, the audio processor 25 according to the embodiment of the invention may output the name of the user account as audio information in order to inform of the setting to the user. For example, when the user account of user 3 is selected, the audio processor 25 outputs the name of the user account of the user 3 in the form of sound, which may be implemented using a technology such as TTS (Text to Speech).

A key input unit 27 may include keys necessary for inputting numbers and text information, and function keys or a touch pad necessary for setting various kinds of functions. When a display unit 50 according to the embodiment of the invention is implemented in a touch screen scheme, the key input unit 27 according to the embodiment of the invention may be excluded from the configuration of the portable terminal or include only preset minimum keys, so that the display unit 50 may be used instead of the excluded functions of the key input unit 27.

In operation, when plural user accounts are identified in a SIM card 40 and the list of the user accounts is displayed so that the user selects any one of them, the key input unit 27 according to the embodiment of the invention receives a key input from the user to select any one of the displayed user accounts.

A memory 30 may include a program memory and a data memory. In the program memory, programs for controlling general operations of the portable terminal are stored. The memory 30 may include an external memory, such as CF (Compact Flash), SD (Secure Digital), Micro-SD (Micro Secure Digital), Mini-SD (Mini Secure Digital), xD (Extreme Digital), and a memory stick, or a storage unit such as HDD (Hard Disk Drive) and SSD (Solid State Drive).

The memory 30 according to the embodiment of the invention may store settings corresponding to the respective user account. For example, as shown in FIG. 3B, the memory 30 according to the embodiment of the invention includes a database 330 in which settings (e.g. data 1, data 2, and data 3) as indicated by the reference numerals 331b to 333b corresponding to respective user accounts (e.g. 331a, 332a, and 333a) are stored.

In the embodiment, the settings corresponding to the respective user account are values for setting various types of usage environments of the portable terminal, in which hardware and software settings necessary for the user to use the portable terminal are stored.

For example, the setting values may include values for setting the user interface which is used by the user to operate (or control) the portable terminal (e.g. setting the menu configurations and visible themes), values for setting a ring tone which is output when a call is received (e.g. setting the kind of a ring tone and volume), values for setting the kind of a wallpaper, values for setting a base language of the key input unit, and values for setting display positions of icons corresponding to the applications or functions which are installed by the user of the user account.

Since all the examples for setting the usage environments of the portable terminal according to the above-mentioned setting values are very extensive, a representative example will be described as follows.

For example, the user may set the wallpaper to be displayed depending on the user account, or set the icons (which correspond to the applications) displayed on the wallpaper to be displayed on different positions depending on the user account. These settings are stored as the setting values corresponding to the user account.

In addition, the user installs the required applications depending on the user account, so that the executable applications may differ (or be the same) depending on the user account. These settings are stored as the setting values corresponding to the user account. When the installed applications are different according to the user account, the types of icons and display positions of the icons corresponding to the applications displayed on the wallpaper will also be different from each other. These settings are stored as the setting values corresponding to the user account.

Further, the user manages (e.g. stores) phone book data (e.g. the contact numbers of acquaintances) separately depending on the user account, so that the user may set the type of the phone book data to be differently displayed in retrieving the phone book data. These settings may be stored as the setting values corresponding to the user account.

The SIM card 40 is a smart card, which includes subscriber information, authentication information and recording information related to the wireless communication and can access a predetermined network, such as a CDMA (Code Division Multiple Access) network, a GSM (Global System for Mobile telecommunication) network, a WCDMA (Wideband code Division Multiple Access) network, and a Wibro (Wireless broadband).

The data of the SIM card 40 is managed by a file system which includes a master file (MF), a dedicated file (DF), and an elementary file (EF). The master file corresponds to a root file. The dedicated file is a file corresponding to a subdirectory of the master file, which supports the functions required by a telecom service, the GSM, and the CDMA and the like. The dedicated file includes plural elementary files in which data used by each service is stored. The elementary files correspond to all the files which are required for executing application files of the respective dedicated files, and in which the authentication information related to security and the subscriber information such as the subscriber phone number, a phone bill, and frequently-used phone numbers are stored.

The SIM card 40 according to the embodiment of the invention stores information related to the user account in a file, which is preset to store the information related to the user account among the predetermined files (e.g. the elementary files).

For example, the SIM card 40 may store information related to the user account and the associated variables in the header of the predetermined file. The controller 10 determines whether one or more user accounts exist in the inserted SIM card with reference to the predetermined elementary file which is preset to store the information related to the user account, so that the existence of the user account and a list of the user accounts may be identified.

Figure 3A:
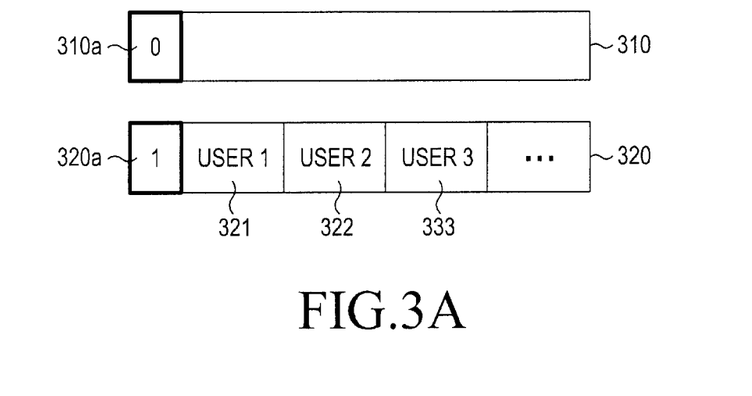
FIGS. 3A and 3B illustrate a first example of the procedure of using the portable terminal according to the embodiment of the invention.
Figure 3B:
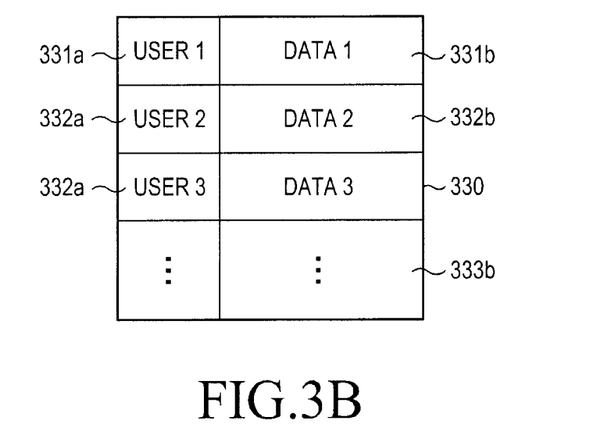

For example, with reference to FIG. 3A, the predetermined elementary file, which is preset to store the information related to the user account, stores the existence of the user account and the list of the user accounts in the format as indicated by reference numeral 310 or 320. The format indicated by the reference numeral 310 in FIG. 3A illustrates an example in which the value of the header 310a is set to "0" indicating no user account, so that the list of the user accounts also does not exist. The format indicated by the reference numeral 320 in FIG. 3A represents an example in which the value of the header is set to "1" indicting the existence of the user account and the information on the list of the existing user accounts (e.g. the names of the user accounts) is stored as indicated by the reference numerals 321 to 323.

Meanwhile, the SIM card 40 according to the embodiment of the invention may store the setting values corresponding to the user accounts. In the description of the memory 30, the setting values corresponding to the user accounts shown in FIG. 3B are stored in the memory 30, but the database as shown in FIG. 3B may be stored in the SIM card 40 when the available data capacity of the SIM card 40 is sufficient. This may be alternatively selected according to the implementation of the embodiment.

The display unit 50 may include an LCD (Liquid Crystal Display) or an OLED (e.g. PMOLED or AMOLED as Organic Light Emitting Diodes), which outputs various kinds of display information generated from the portable terminal. The display unit 50 may include a touch screen to serve as an input unit which controls the portable terminal along with the key input unit 27.

Figure 4A:
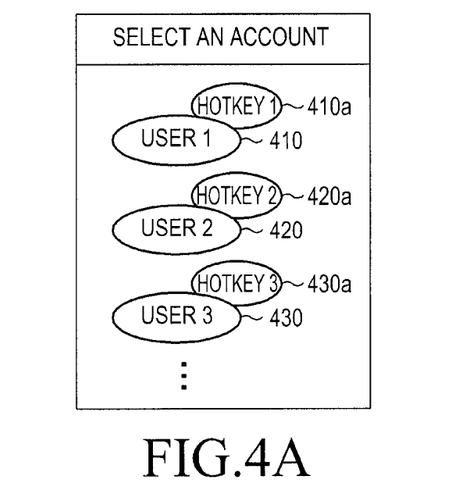
FIGS. 4A and 4B illustrate a second example of the procedure of using the portable terminal according to the embodiment of the invention.

As a result of checking of the inserted SIM card, when it is determined that the inserted SIM card contains one or more user accounts, the display unit 50 according to the embodiment of the invention displays a list of the user accounts as shown in FIG. 4A, so that the user can log in by selecting any one of the displayed user accounts. Here, the logging in by selecting the user account may be understood as a part of a process of using the portable terminal by setting its usage environment with the setting values corresponding to the selected user account.

In addition, in displaying the list of the existing user accounts, the display unit 50 according to the embodiment of the invention displays corresponding hot keys 410a, 420a, and 430a along with the user accounts in order for the user to select the displayed user accounts quickly. Therefore, the user may input the hot key while identifying the display unit 50 to select the desired user account to use (log in) quickly. For example, when the hot key "1" is input, the user account 410 may be selected; when the hot key "2" is input, the user account 420 may be selected; and when the hot key "3" is input, the user account 430 may be selected quickly.

Figure 4B:
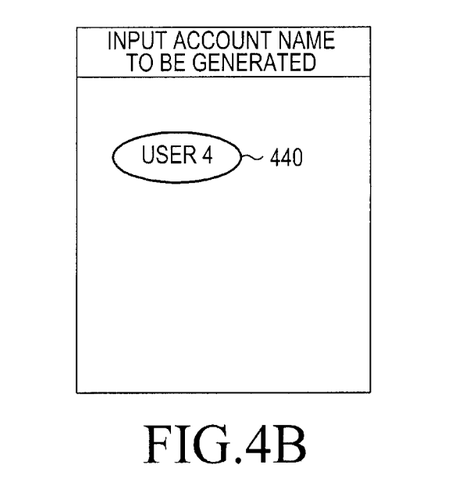

Further, as a result of the checking of the inserted SIM card, when it is determined that the inserted SIM card contains no user accounts, the display unit 50 according to the embodiment of the invention displays a guide screen through which the user inputs the name of a new user account (e.g. user 4) to log in as shown in FIG. 4B.

The controller 10 may control overall operations of the portable terminal according to the embodiment of the invention, and may switch and control the operations of the portable terminal according to the user inputs from the key input unit 27 or the display unit 50. The controller 10 according to the embodiment of the invention makes a control to determine whether one or more user accounts exist or not by identifying the SIM card. Then, if it is determined that one or more user accounts exist, the controller 10 according to the embodiment of the invention makes a control to display the list of the user accounts. When any one of the user accounts is selected, the controller 10 makes a control to apply the setting values corresponding to the selected user account to the usage environment of the portable terminal. Hereinafter, the detailed operations of the controller 10 according to the embodiment of the invention will be described with reference to FIG. 2.

Figure 2:
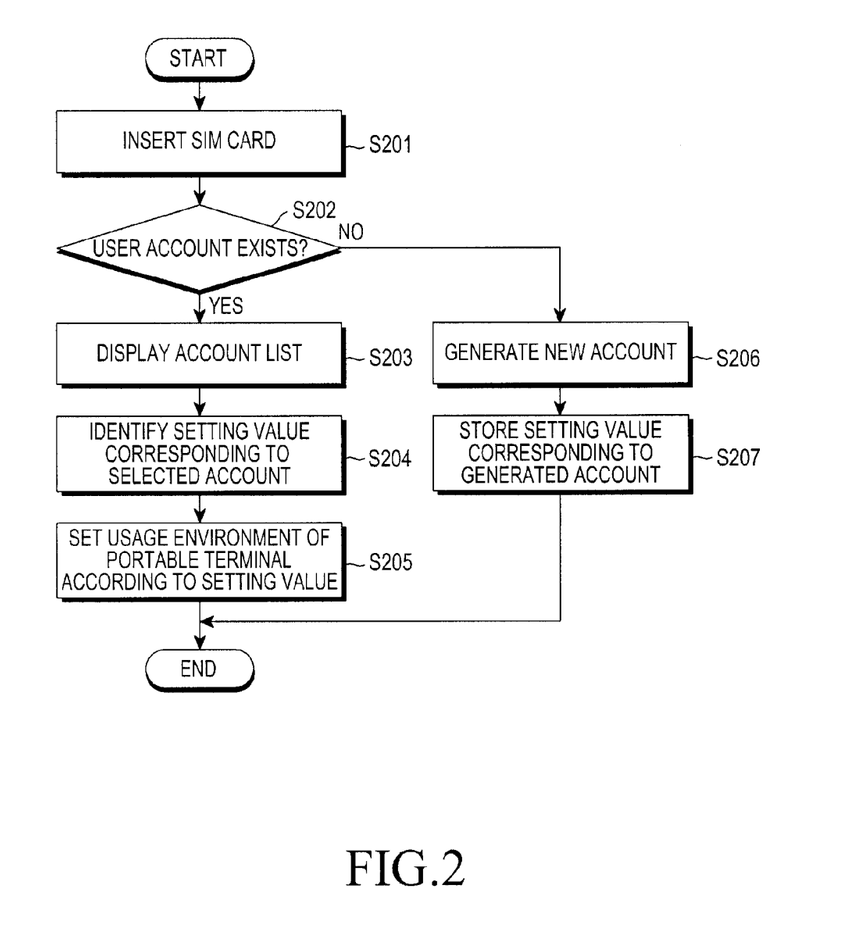
FIG. 2 is a flow diagram illustrating the procedure of using a portable terminal according to an embodiment of the invention.
Figure 5A:
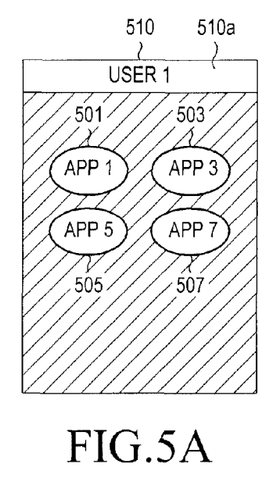
FIGS. 5A to 5C illustrate a third example of the procedure of using the portable terminal according to the embodiment of the invention.
Figure 5B:
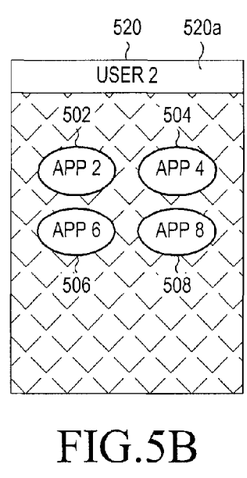
Figure 5C:
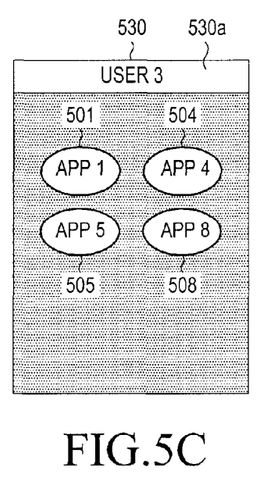

FIG. 2 is a flowchart illustrating the process of using the portable terminal according to the embodiment of the invention. FIGS. 3A and 3B illustrate a first example of using the portable terminal according to the embodiment of the invention. FIGS. 4A and 4B illustrate a second example of the using the portable terminal according to the embodiment of the invention. FIGS. 5A to 5C illustrate a third example of using the portable terminal according to the embodiment of the invention.

In steps S201 to S202, when the SIM card is inserted, the controller 10 makes a control to determine whether one or more user accounts exist in the inserted SIM card.

In the embodiment of the invention, the existence of the user account may be identified with reference to a predetermined data area within the SIM card which is preset to inform of the existence of the one or more user accounts.

Therefore, the controller 10 may determine whether one or more user accounts exist by referring to a header value of the data area of the SIM card which is preset.

For example, with reference to FIG. 3A, when the controller 10 identifies the header of the data area of the SIM card which is preset to inform of the existence of the one or more user accounts, if the header value is "0", the controller 10 may determine that no user accounts exist in the inserted SIM card.

On the contrary, if the data area of the SIM card which is preset to inform of the existence of the one or more user accounts is formed as indicated by the reference numeral 320 of FIG. 3A and the header value thereof is "1" as indicated by the reference numeral 320a, the controller 10 may identify that plural user accounts, such as the user accounts 321, 322, and 323, exist in the inserted SIM card.

In step S203, the controller 10 makes a control to display the list of the user accounts.

As a result of above step, if it is determined that one or more user accounts exist (e.g. if the data area is identified as indicated by the reference numeral 320 illustrated in FIG. 3A), the controller 10 makes a control to display the list of the existing user accounts as shown in FIG. 4A.

The user may select any one of the user accounts (or the names of the user accounts), which are displayed as indicated by the reference numerals 410, 420, and 430 in FIG. 4A, to request the use of the portable terminal according to the selected user account (e.g. logging in with the selected user account). Here, when any one of the user accounts shown in FIG. 4A is selected, the controller 10 may make a control to request the input of a password corresponding to the selected user account. When the correct password is not entered, the controller 10 may not allow the user to use the portable terminal with the selected user account.

Therefore, the controller 10 according to the embodiment of the invention makes a control to display the hot keys 410a, 420a, and 430a corresponding to the user accounts 410, 420, and 430, respectively. Therefore, when the user wants to select a predetermined user account to use the portable terminal, the user can enter the hot key to select the user account quickly.

For example, the user may enter the hot key 1 to select the user account 410, the hot key 2 to select the user account 420, or the hot key 3 to select the user account 430 quickly.

In steps S204 to S205, the controller 10 identifies the setting values corresponding to the selected user account, and makes a control to set the usage environment of the portable terminal according to the setting values.

When any one in the list of the plural user accounts shown in FIG. 4A is selected, the controller 10 identifies the setting values, which correspond to the user account and are selected according to the reference data shown in FIG. 3B.

The reference data described in the example of FIG. 3B is the data which includes a record of the setting values 331b, 332b, and 333b corresponding to the user accounts 331a, 332a, and 333a. The controller 10 may identify the reference data to identify the setting values of each user account. In alternate embodiment, the above-mentioned reference data may be selectively stored in the memory 30 or the SIM card 40 for reference in the future.

When the identification of the setting values is completed, the controller 10 makes a control to set the usage environment of the portable terminal according to the identified setting values, which will be described with reference to FIG. 5 hereinafter.

FIG. 5A illustrates an example in which the user account of user 1 is selected to set the usage environment of the portable terminal according to the corresponding setting values (e.g. data 1 shown in FIG. 3B). In the example of FIG. 5A, the icons (501, 503, 505, 507 and etc.) corresponding to the applications which are installed by user 1 of the selected user account (i.e. which are available in the user account of user 1) are displayed on predetermined positions.

FIG. 5B illustrates an example in which the user account of user 2 is selected to set the usage environment of the portable terminal according to the corresponding setting values (e.g. data 2 shown in FIG. 3B). In the example of FIG. 5B, the icons (502, 504, 506, 508 and etc.) corresponding to the applications which are installed by user 2 of the selected user account (i.e. which are available in the user account of user 2) are displayed on predetermined positions.

FIG. 5C illustrates an example in which the user account of user 3 is selected to set the usage environment of the portable terminal according to the corresponding setting values (e.g. data 3 shown in FIG. 3B). In the example of FIG. 5B, the icons (501, 504, 505, 508 and etc.) corresponding to the applications which are installed by user 3 of the selected user account (i.e. which are available in the user account of user 3) are displayed on predetermined positions.

The setting example of the usage environment described with reference to FIGS. 5A to 5C illustrates the example in which different wallpapers and different applications are displayed according to the selected user account (or the logged in user account).

However, as described above, the usage environment to be set by the setting values may include all settings for hardware/software, such as a user interface, the kind of the ring tone and volume, and the base language of the keypad, which are necessary for the user to use the portable terminal.

After the usage environment of the portable terminal is set to the setting values corresponding to the selected user account, the name of the user account (e.g. the logged in user account), which is set in the usage environment, may be displayed on a predetermined position in order for the user to identify it easily.

For example with reference to FIGS. 5A to 5C, the controller 10 completes the settings of the usage environment of the portable terminal, such as displaying the wallpaper and the applications which are different according to the setting values corresponding to the user accounts, and displaying the icons corresponding to the applications on the predetermined positions. Then, the controller 10 may make a control to display the name of the user account corresponding to the setting value as indicated by the reference numerals 510a, 520a, and 530a.

At this time, the names of the user accounts as indicated by the reference numerals 510a, 520a, and 530a may be displayed in an area which is predetermined in the screen such as an indicator bar. Here, the indicator bar is an area in which additional information related to the usage of the portable terminal is displayed on a specified position of the screen (e.g. the upper end or the lower end of the screen), which either may disappear when a predetermined application is executed or may continue being displayed even though the predetermined application is executed. The indicator bar may display additional time information (e.g. current time), the reception sensitivity of electric waves, the remaining amount of the battery, the vibration setting (e.g. the vibration on/off), and the connection state of wireless communication (e.g. the connection state of Wi-Fi, Bluetooth or the like).

In steps S206 and S207, the controller 10 generates a new user account and makes a control to store the setting values corresponding to the generated user account. That is, As a result of the checking in step S202, when it is determined that the inserted SIM card contains no user account, the controller 10 stores the name (e.g. user 4) of the new user account which is input by the user through the screen as shown in FIG. 4B, and stores the setting values (e.g. data 4) corresponding to the newly generated user account as shown in FIG. 3B.

At the same time, the controller 10 updates the data area of the SIM card which is predetermined to inform of the existence of the one or more user accounts (e.g. the header 310a shown in FIG. 3A is changed into 1, and user 4 is recorded in the area 310 just like the areas 321 to 333). When the SIM card is checked in the future, the controller 10 determines that one or more user accounts exist. Therefore, when the user account of user 4 is required to be used in the portable terminal, the controller 10 may make a control to set the usage environment of the portable terminal according to the setting value of data 4.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

The present invention has been described in detail, but it is apparent that the embodiment described above is just an example and does not limit the invention. The equivalent modifications in components, which may be equally replaced with those of the invention, will be included in the scope of the invention without departing from the technical idea as it is provided in the following claims.

What is claimed is:

1. A method in a portable terminal, the method comprising:
identifying information of a plurality of user accounts stored in the terminal, by referencing an elementary file containing the information, the elementary file being stored on a SIM (Subscriber Identity Module) card inserted in the terminal;
displaying a list of the user accounts, with each user account displayed in a manner associated with a different user;
detecting a selection of one of the displayed user accounts, and identifying a setting value corresponding to the selection; and
setting a usage environment of the portable terminal according to the identified setting value, the usage environment including a displayed name of the user associated with the selected user account;
wherein the SIM card stores information related to each user account in the elementary file, which is preset to store the information related to each user account, stores information indicating existence of a user account, and stores the list of the user accounts.

2. The method as claimed in claim 1, further comprising, prior to identifying information of a plurality of user accounts, generating a new user account when it is initially determined that the user accounts do not exist in the terminal.

3. The method as claimed in claim 2, further comprising storing a new setting value corresponding to the new account.

4. The method as claimed in claim 1, wherein displaying of the list of the existing user accounts comprises:
displaying hot keys corresponding to the displayed user accounts, the hot keys allowing a user to select the respective user account.

5. The method as claimed in claim 4, wherein selecting any one of the displayed user accounts corresponds to selecting the hot key.

6. The method as claimed in claim 1, wherein identifying of the setting value comprises:
when any one of the displayed user accounts is selected, requesting input of a password corresponding to the selected user account; and
when it is determined that the entered password is correct, identifying the setting value which corresponds to the selected user account.

7. The method as claimed in claim 1, wherein the setting value defines value for setting at least any one of a user interface, phone book data, a ring tone, a wallpaper, a base language, an application, and a position of an icon corresponding to the application, for each of the user accounts.

8. An apparatus in a portable terminal, comprising:
a memory; and
a controller configured to control operations of identifying information of a plurality of user accounts stored in the terminal, by referencing an elementary file containing the information, the elementary file being stored on a SIM (Subscriber Identity Module) card inserted in the terminal; displaying a list of the user accounts, with each user account displayed in a manner associated with a different user; detecting a selection of one of the displayed user accounts, and identifying a setting value corresponding to the selection; and setting a usage environment of the portable terminal according to the identified setting value, the usage environment including a displayed name of the user associated with the selected user account;
wherein the SIM card stores information related to each user account in the elementary file, which is preset to store the information related to each user account, stores information indicating existence of a user account, and stores the list of the user accounts.

9. The apparatus as claimed in claim 8, wherein, prior to identifying information of a plurality of user accounts when it is determined that no user accounts exist in the terminal, the controller controls generation of a new user account.

10. The apparatus as claimed in claim 9, wherein the controller controls storing a new setting value corresponding to the new account.

11. The apparatus as claimed in claim 8, wherein when one or more user accounts are displayed, the controller controls displaying hot keys corresponding to the displayed user accounts for selection.

12. The apparatus as claimed in claim 11, wherein selecting any one of the displayed user accounts corresponds to selecting the hot key.

13. The apparatus as claimed in claim 8, wherein when any one of the displayed user accounts is selected, the controller controls requesting input of a password corresponding to the selected user account and identifying the setting value which corresponds to the selected user account when the password is correct.

14. The apparatus as claimed in claim 8, wherein the setting value defines value for setting at least any one of a user interface, phone book data, a ring tone, a wallpaper, a base language, an application, and a position of an icon corresponding to the application, for each of the user accounts.

15. The method as claimed in claim 1, further comprising storing a different set of phone contacts for each user account, wherein the usage environment for the selected user account includes the set of phone contacts for that user account.

16. The apparatus as claimed in claim 8, wherein a different set of phone contacts is stored for each user account, and the usage environment for the selected user account includes the set of phone contacts for that user account.

17. The method as claimed in claim 1, wherein the SIM card stores the existence of a user account in a header in the elementary file.

18. The apparatus as claimed in claim 8, wherein the SIM card stores the existence of a user account in a header in the elementary file.

* * * * *